Aug. 16, 1966 D. E. BLOXSOM 3,267,379
AUTOMATIC RADIO TELEPHONE AND SIGNALING COMMUNICATION DEVICE
Filed July 10, 1963
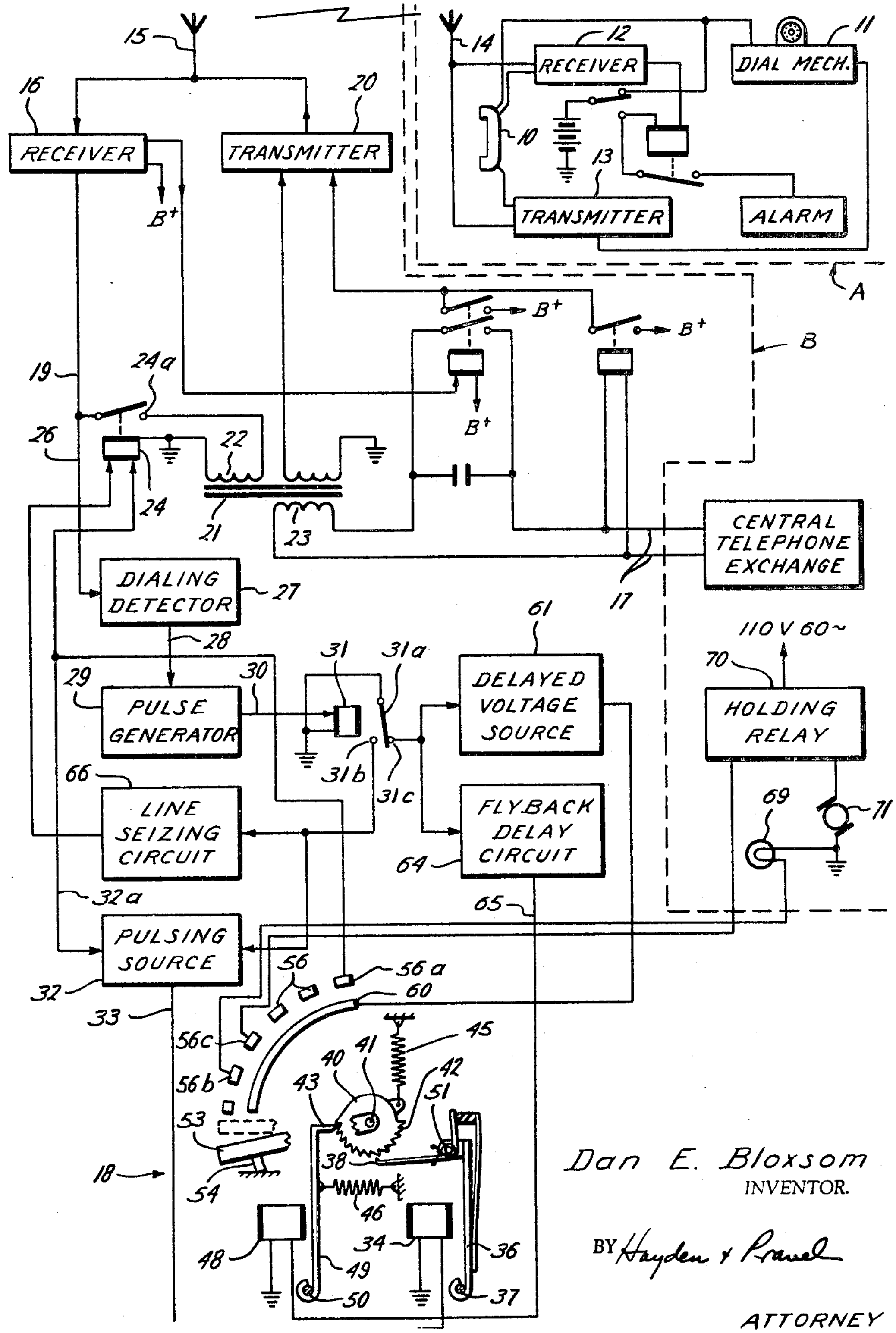
Dan E. Bloxsom
INVENTOR.
BY Hayden + Pravel
ATTORNEY United States Patent Office 3,267,379
Patented August 16, 1966

3,267,379
AUTOMATIC RADIO TELEPHONE AND SIGNALING COMMUNICATION DEVICE

Dan E. Bloxsom, 22 E. Shady Lane, Houston, Tex.
Filed July 10, 1963, Ser. No. 294,011
4 Claims. (Cl. 325—55)

This invention relates generally to automatic radio-telephone apparatus and more particularly to an automatic radio-telephone system providing communication with a base station from a remote subscriber to selectively connect the remote subscriber to a conventional telephone line or to start, stop, or otherwise control external devices.

Telephone communication between mobile vehicles or remote locations and base stations utilizes radio transmissions in place of the customary telephone line which electrically connects the telephone equipment in the subscriber's possession with the centrally located telephone equipment. Such equipment includes a radio transmitter and receiver associated with the remote telephone for maintenance of two-way communication with the base station. With this invention, the usual equipment associated with a remote or mobile telephone subscriber is utilized in combination with a new apparatus for starting, stopping, or otherwise controlling the operation of equipment through radio transmissions.

An object of this invention is to provide a new and improved circuit for use in two-way telephone communication systems which allows a user having remote or mobile equipment to automatically connect into a conventional telephone line or to alternatively start, stop, or otherwise operate external devices automatically with the same remote or mobile equipment.

A further object of this invention is to provide a new and improved circuit for use with remote or mobile equipment which communicates the user or subscriber with a base station wherein audio communication with the subscriber may be established and the subscriber may operate external devices from his remote or mobile station, whereby some of the remote equipment that was heretofore considered necessary has been eliminated.

An important object of this invention is to provide a new and improved circuit for use with a mobile or remote telephone system which, without alteration of that remote equipment makes it possible for the remote equipment to be used to start, stop and otherwise operate certain devices with dialing means, push-button means or other encoding means associated with the remote equipment.

Another object of this invention is to provide a new and improved circuit for use with a mobile telephone system which enables the operator of the equipment to selectively maintain two-way communication through a conventional telephone line and also start, stop, or otherwise control the operation of external equipment, with each function accomplished independently of the other.

Still another object of this invention is to provide a new and improved circuit which renders operative external equipment in a unique manner and holds the equipment in an operative state without continuous monitoring by or operation of the invention.

Yet another object of this invention is to provide a new and improved circuit for use with a base station which connects a mobile or remote telephone subscriber with the base station to operate external equipment without interfering with two-way communications from the telephone subscriber to a conventional telephone exchange.

Other objects and advantages of the present invention will become apparent from a consideration of the following description and drawing wherein:

The figure of the drawing is a schematic diagram illustrating one embodiment of the invention.

Considering the invention broadly, the drawing illustrates a mobile telephone apparatus at A having associated therewith a hand telephone set 10, a dialing mechanism 11, a radio receiver 12, and a transmitter 13. The equipment A broadcasts a carrier wave having intelligence modulated thereon with conventional means (not shown) from an antenna 14 to a circuit B for reception through an antenna 15 and demodulation by a receiver 16. After the demodulation of the carrier wave by the receiver 16 and the subsequent dialing or otherwise encoding by the subscriber of a predetermined symbol, the mobile telephone A is communicated with a conventional telephone line 17. However, if such telephone is not desired, this unique circuit makes it possible to start, stop, or otherwise operate external devices by dialing or otherwise encoding other predetermined symbols. As will be explained, the circuit B distinguishes various preliminary digits or symbols through operation of a stepping relay 18 which responds to various digits or symbols to actuate different portions of the circuit. Basically, therefore, this invention makes it possible for the user of the mobile telephone to selectively use the telephone-radio circuitry or to control external equipment by dialing or otherwise manipulating the same telephone apparatus A.

Considering the invention more in detail, the mobile telephone A is preferably of the type shown in U.S. Patent No. 2,894,121, issued July 7, 1959, to Raymond P. Phillips and entitled, "Radiotelephone System Featuring Switching Circuit for Portable Radio Transmitter and Receiver." Such patent discloses an automatic telephone for remote or mobile use which transmits dialing pulses to a circuit which automatically responds to the dialing intelligence. The circuit B of this invention incorporates the elements of that patent which accomplish radiotelephone communication by automatically connecting the mobile operator with the telephone line. While Patent No. 2,894,121 reveals the preferred apparatus for automatic telephone operation, those skilled in the art may incorporate other automatic radiotelephone systems with the invention herein disclosed. For instance, Patent No. 3,087,998 reveals an automatic radiotelephone system which encodes dialing information as three tones preselected from a group of five tones. The dialing information is decoded by applying the various tones to a group of band pass filters operating a plurality of relays to create the sequential dialing pulses normally required by telephone exchange equipment.

The mobile telephone A transmits a sequence of pulses produced by dialing, push buttons, or other encoding means in the preferred form to connect the remote telephone 10 to the conventional telephone line 17. The circuit B responds to a transmission from the remote telephone A in the following manner. The receiver 16 is tuned to the frequency of the transmitter 13 to develop a conventional output signal which is transmitted through a line 19 which is connected to a transformer 21. The transformer 21 includes windings 22 and 23 for the transfer of the customary audio signal and exchange operating pulses from the line 19 to the telephone line 17 connected to the transformer 21. A transmitter 20 is also connected to the transformer 21 for two-way communication. It will be noted that the output signal in the line 19 is first connected to a normally open set of contacts 24*a* of a relay 24; the operation of the relay 24 will be more apparent in the light of the following discussion. The receiver 16 has a second output signal which is transmitted through line 26 and which is identical to the signal in line 19. The line 26 is connected to a dialing detector 27 which detects the dialing intelligence in the transmitted information supplied by the output in line 26 and forms a signal which passes through conductor 28 and is indicative of such dialing intelligence. The signal flowing in conductor 28 is fed to a pulse generator 29 which creates a sequence of dialing pulses in line 30 in response to the signal in conductor 28. The particular construction of the dialing detector 27 and the pulse generator 29 is dependent on the form of the pulse encoding mechanism 11 used at the portable telephone A. If, for instance, the dialing mechanism 11, such as that shown in U.S. Patent No. 3,087,998, forms three tones to represent each of the ten digits, the dialing detector 27 would be comprised of a set of notch filters, and the pulse generator 29 would form the sequential dialing pulses in line 30 representing each digit from the outputs of the notch filters. Whatever the construction of the components of the detector 27 and the generator 29, the wave form of the output signal of the pulse generator 29 is preferably a voltage level which is reduced during the occurrence of each dialing pulse.

The dialing pulse signal in line 30 in the preferred embodiment operates a relay 31. Thus, the relay 31 is energized to move its armature 31*a* into engagement with the contact 31*b* when the quiescent voltage component of the signal in line 30 is created by transmission of the carrier wave originated by the mobile telephone A. When dialing at the telephone A occurs, the relay 31 is released so that the armature 31*a* moves to contact 31*c* upon the occurrence of each dialing pulse of the signal in line 30 and remains at such position for the duration of the dialing pulse (see position shown in the drawing). At the end of the dialing pulse, the relay 31 is re-energized by the quiescent voltage component to return the armature 31*a* into engagement with the contact 31*b*. It is to be noted that the armature 31*a* is connected to ground and by alternately engaging the contacts 31*b* and 31*c*, the circuits including each of such contacts are alternately grounded for a purpose to be hereinafter explained.

A conventional pulsing source 32, such as a relay, in response to the periodic grounding of the armature 31*a* and the contact 31*b*, simultaneously forms a series of stepping signals in conductor 33 for the operation of a solenoid 34. Stepping in response to the stepping signals in line 33 is accomplished by the stepping relay designated generally at 18. The electromagnet 34 attracts a lever 36 which is pinned to a pivot 37 and has a pawl 38 at the movable end. A ratchet gear 40 is rotatably mounted on a shaft 41 for stepped rotation in response to movement of the pawl 38 against a set of gear teeth 42. A stop pawl 43 engages the teeth 42 as the pawl 38 rotates the gear 40 against the tension of a spring 45 to arrest backward rotation of the gear 40. The stop pawl 43 is spring loaded by a spring 46 to maintain contact with the ratchet wheel 40 to prevent counterclockwise rotation. A flyback electromagnet 48 attracts a lever 49 having the stop pawl 43 mounted opposite a pivoted end 50 thereof to withdraw the pawl 43 from between the teeth 42 of the gear 40 to free the gear 40 to rotate counterclockwise in response to the tension of the spring 45. A spring loaded knuckle joint 51 in the lever 36 urges the pawl 38 into the notches between the teeth 42 while permitting it to move sufficiently to ride over the teeth 42 when the lever 36 moves to the right (as viewed in the drawing) by a release of the lever 36 from the solenoid 34. A wiper arm 53 made of some conducting material is fixedly attached to the gear 40 and extends radially from the shaft 41 about which it rotates. In the unstepped position which is illustrated in the drawing, the lever arm 53 is shown resting against a stop 54 which maintains the lever arm 53 in a neutral or nonconducting position. When the receiver 16 provides a carrier output signal 26 to the dialing detector 27 and causes the relay 31 to operate, bringing the armature 31*a* in contact with the terminal 31*b*, the pulsing source 32 creates a stepping signal in line 33 which operates the solenoid 34. The magnetic attractive force created by the solenoid 34 moves the lever 36 about its pivot 37 to force the pawl 38 against the teeth 42 of the ratchet 40. The lever 36 swings the pawl 38 a limited tangential distance while engaging the teeth 42 of the ratchet 40 to rotate the ratchet 40 a predetermined amount. Motion of the lever 36 is limited in the preferred embodiment by physical engagement with the electromagnet 34 at the end of the stroke. The tangential push of the pawl 38 rotates the ratchet 40 an amount which is an integral multiple of the arcuate length of the teeth 42 on the periphery of the gear 40. This results from the arrangement whereby the spring 45 tends to rotate the gear 40 counterclockwise against the stop pawl 43 which stops the gear 40 with the same spatial relationship existing between the pawl 43 and the adjacent teeth 42. Since each of the teeth 42 spans equal arcuate lengths about the gear 40, each operation of the solenoid 34 rotates the gear 40 an equal amount.

The drawing shows in dotted line the position of the wiper arm 53 after the reception of the carrier wave from the mobile telephone 10 awaiting any preliminary dialing pulses. If the mobile subscriber then desires to use his mobile telephone 10 in a conventional manner, dialing of a preliminary digit or symbol which is predetermined will connect him with the telephone lines 17. In the drawing, a set of terminals 56 is arranged within sweep of the wiper arm 53 and each of the terminals is spaced from adjacent terminals whereby the lever arm 53 contacts a different one of the terminals 56 upon a dialing of each different digit or symbol. To cooperate with equipment designed for decimal encoding, ten terminals are arranged about the ratchet 40 for contact and the last terminal is arbitrarily selected to actuate equipment connecting the subscriber to the conventional telephone line 17 by dialing "zero" or any other designated digit.

When the subscriber dials zero, the pulsing source 32, in response to the grounding of the contact 31*b*, provides a stepping signal in line 33 having eleven pulses, one occurring on reception of the carrier initially and the last ten occurring with each dialing pulse in the conductor 30 generated by the pulse generator 29. The first pulse steps the wiper arm 53 to the dotted position, and each subsequent pulse moves the arm 53 across the terminals 56 to the terminal 56*a* corresponding to the tenth digit. In that position, the stepping relay 18 is prepared to apply an operating voltage to the telephone line relay 24. A bus bar 60 of conducting material maintains contact with the wiper arm 53 in all digital positions. Voltage is not applied to the bus bar 60 at all times to avoid electrification of terminals 56 representing small numbers as the wiper arm 53 moves toward a higher number terminal 56. A delayed voltage source 61 connects a voltage to the bus bar 60 only after the wiper arm 53 has rested on a particular terminal 56 for a period of time indicating that the sequence of dialing pulses has stepped the wiper arm 53 to the terminal 56 such as 56*a* representing the digit dialed by the subscriber.

The inverse contact 31*c* of the relay 31 provides electrical grounding to the circuitry connected thereto which is complementary to the grounding of the contact 31*b*. A fly back delay circuit 64 connected to the contact 31*c* creates a fly back voltage in line 65 when the carrier signal ceases and returns the armature 31*a* to the illustrated position of the drawing. The flyback delay 64 also provides a fly back pulse in the line 65 after each digit is dialed to return the arm 53 to the rest position against the stop 54. If the telephone 10 is operated to transmit a carrier signal to the receiver 16 and the subscriber for some reason does not dial a number and "hangs up," the fly back delay 64 returns the wiper arm 53 to the rest position. Also, the fly back delay 64 returns the wiper arm 53 after each digit is completed to enable more than one operation to be completed with each transmission.

The delayed voltage source 61 is connected to the contact 31*c* to place a voltage on the bus bar 60 after the last pulse of any sequence of dialing pulses. It applies the voltage to the bus bar 60, the wiper arm 53, and the terminal 56 then contacted by the arm 53. The delayed voltage source 61 applies its voltage and removes same before the fly back delay 64 operates the fly back solenoid 48 to return the arm 53 to the rest position.

The signal from the delayed voltage source 61 is connected to any of the terminals 56. Assuming the subscriber has dialed a zero with the dialing mechanism 11 which causes the arm 53 to position itself in control with the "zero" terminal **56*a*, the voltage from the delayed voltage source 61 is connected to the relay 24 as shown in the drawings. The relay 24 has a second input terminal from a conventional line seizing circuit 66, such as a relay, which is operated when the terminal 31*b* is initially contacted by the armature 31*a* to apply voltage to the relay 24 when the relay 31 operates to indicate the reception of a carrier wave by the receiver 16. Thus, two conditions operate the telephone line relay 24: the reception of the transmitted carrier wave from the mobile telephone 10 to seize the line, followed by the operation of the stepping relay 18 by the subscriber's subsequent dialing to zero to move the arm 53 to the zero terminal 56*a*. The relay 24 is constructed to operate on simultaneous occurrence of these two signals and to maintain the operated position in response to the line seizing circuit 66. It is preferable to place a delay element in the circuit 66 to avoid disconnecting the subscriber if the signal transmitted to the circuit B is momentarily interrupted as often occurs in radio transmissions. For increased versatility of the circuit B, the relay 24 remains operative after the fly back delay circuit 64 returns the wiper arm 53** to the rest position.

The zero terminal **56*a* is also connected by line 32*a* to the pulsing source 32 to delay operation of the source 32 while the user of the telephone 10 is dialing the digits calculated to ring a party through the central exchange. Preferably, a slow release relay which holds for an adequate length of time to allow the dialing of several digits is incorporated in the pulsing source 32 to prevent operation of the stepping relay 18 while the user dials a telephone number. The user may complete his conversation with the called party through the circuit 13 and the central exchange and terminate operation of the equipment by "hanging up." The carrier wave is not transmitted thereafter which causes the relay 31 to de-energize, grounding the contact 31*c* against the armature 31*a*. The line seizing circuit 66 operates after lapse of time to release the relay 24 to disconnect the receiver 16 from the telephone line 17**. Thus, all circuit components of the invention are prepared for future operation upon removal of the carrier wave.

If the operator of the remote station A desires to operate remote equipment, he dials any digit other than zero or the equivalent symbol which connects the telephone circuit. For example, to operate a light bulb 69 by dialing with the apparatus A, the fourth digit or symbol is dialed to cause the wiper arm 53 to be pawled up to the fourth terminal **56*b*, and thereafter the delayed voltage circuit 61 pulses the circuitry connected to that terminal to energize or turn on the light bulb 69. After energizing the light bulb 69, the fly back delay circuit 64 operates by lapse of time to return the arm 53 to its rest position at stop 54**.

By way of further example, if the subscriber dials the fifth digit or symbol, the arm 53 is moved to the fifth terminal **56*c* which is connected to a holding relay 70 and an external device such as a motor 71. The holding relay 70 is closed by the energizing pulse from the stepping relay 18 to apply operating voltage to the device 71. As explained above, the fly back delay circuit 64 causes the wiper arm 53 to return to the rest position adjacent the stop 54 after the delayed voltage source 61 removes the voltage from the holding relay 70. The holding relay 70 maintains the motor or other device 71 in an operative state indefinitely until the subscriber dials the fifth digit to reoperate the stepping relay 18 to reverse the operative status of the relay 70. Those skilled in the art may include in the device 71 means breaking the electrical power circuit of that device to return it to an inoperative status. Of course, a different external device may be connected to each of the terminals 56 corresponding to each of the ten digits with the exception of the terminal 56*a***.

The invention may be practiced incorporating various changes known to those skilled in the art. For instance, electronic switching and pulsing devices may be used in place of relays illustrated in the drawing. The invention may be used with any form of pulse encoding and decoding equipment with appropriate alteration of the dialing detector 27 and pulse generator 29. Also, the stepping relay 18 may be altered to operate up to one hundred external devices in response to two preliminary dialing sequences. Also, the preferred embodiment may be incorporated with telephone equipment such as automatic answering devices.

Briefly, the invention relates to an automatic telephone system utilizing radio transmissions and having means connecting a remote subscriber to a conventional telephone line and rendering external devices operative.

What is claimed is:

1. A circuit for co-operation with a mobile telephone-radio unit adapted to broadcast pulse sequences and other intelligence to a station in communication with a telephone line communicating by way of a central exchange with other telephone lines and subscribers thereto and wherein a plurality of external electrically actuated devices are controlled from the station, comprising:

(a) a receiver tuned to the broadcast of a mobile telephone-radio unit to receive pulse sequences therefrom to form an output signal;

(b) means for separating the pulse sequences from other intelligence in the output signal from said receiver;

(c) electrical step switching means;

(d) a holding relay connected to said electrical step switching means at a step thereof, said step having a relationship to a selected pulse sequence so that said step switching means operates to the step;

(e) an external electrically operated device operably connected to said relay for deriving electrical power therefrom when actuated;

(f) means operated by said separated pulse sequences to operate said step switching means, and on occurrence of the selected pulse sequence operating said step switching means to the selected step;

(g) said operation of said step switching means operating said holding relay to apply electrical power to the external device;

(h) a telephone line connected to switch means with the output signal of said receiver also connected to said switch means;

(i) holding means operated by continued reception of the signal from the mobile telephone-radio unit for holding said switch means closed; and (j) wherein a selected step of said step switching means is connected to said holding means for initiating operation of said holding means on operation of said step switching means to the selected step.

2. The invention of claim 1 including a transmitter communicated with the telephone line through said switch means, said transmitter tuned to broadcast to the mobile telephone-radio unit for maintaining two way communications therewith.

3. The invention of claim 1 including a delayed signal source connected to said step switching means for supplying a signal thereto delayed sufficiently to permit said step switching means to operate to the selected step associated with the separated pulse sequences to thereby initiate operation of the means connected to the selected step.

4. The invention of claim 3 including means for resetting said step switching means to its initial condition after operation of said delayed signal source.

References Cited by the Examiner

UNITED STATES PATENTS

| | | | |
|---|---|---|---|
| 1,726,947 | 9/1929 | Chauveau | 179—2 |
| 2,129,332 | 9/1938 | Mastini | 343—177 X |
| 2,265,056 | 12/1941 | Bowers | 325—55 |
| 2,363,145 | 11/1944 | Robbins | 172—2 |
| 2,564,600 | 8/1951 | Allen | 325—64 X |
| 2,697,823 | 12/1954 | Undy | 343—225 X |
| 2,757,368 | 7/1956 | King et al. | 343—225 |
| 2,877,444 | 3/1959 | Hawley | 317—140 X |
| 2,894,121 | 7/1959 | Phillips | 325—16 X |
| 3,049,592 | 8/1962 | Waldman | 179—2 |
| 3,193,623 | 7/1965 | Burns et al. | 325—16 X |
| 3,198,888 | 8/1965 | Lemelson | 325—55 X |

DAVID G. REDINBAUGH, *Primary Examiner.*

J. W. CALDWELL, *Assistant Examiner.*